(12) United States Patent
Freeman et al.

(10) Patent No.: US 9,260,655 B2
(45) Date of Patent: Feb. 16, 2016

(54) ALKYL-ACID LIGANDS FOR NANOCRYSTALS

(71) Applicant: Nanosys, Inc., Milipitas, CA (US)

(72) Inventors: William P. Freeman, San Mateo, CA (US); Paul T. Furuta, Sunnyvale, CA (US); Robert Dubrow, San Carlos, CA (US)

(73) Assignee: Nanosys, Inc., Milpitas, CA (US)

( * ) Notice: Subject to any disclaimer, the term of this patent is extended or adjusted under 35 U.S.C. 154(b) by 9 days.

(21) Appl. No.: 14/208,084

(22) Filed: Mar. 13, 2014

(65) Prior Publication Data

US 2014/0275431 A1 Sep. 18, 2014

Related U.S. Application Data

(60) Provisional application No. 61/783,724, filed on Mar. 14, 2013.

(51) Int. Cl.
*C08K 11/00* (2006.01)
*C09K 11/02* (2006.01)
*C09K 11/70* (2006.01)
*C09K 11/88* (2006.01)

(52) U.S. Cl.
CPC .............. *C09K 11/025* (2013.01); *C09K 11/70* (2013.01); *C09K 11/883* (2013.01)

(58) Field of Classification Search
None
See application file for complete search history.

(56) References Cited

U.S. PATENT DOCUMENTS

| 5,288,814 | A | * | 2/1994 | Long et al. | 525/450 |
| 5,578,598 | A | * | 11/1996 | Abe et al. | 514/2.4 |
| 2005/0136258 | A1 | * | 6/2005 | Nie | A61K 47/48861 428/402 |
| 2009/0139929 | A1 | * | 6/2009 | Laurino | 210/638 |
| 2010/0069550 | A1 | * | 3/2010 | Gao et al. | 524/401 |
| 2012/0113672 | A1 | | 5/2012 | Dubrow et al. | |
| 2012/0205598 | A1 | | 8/2012 | Li et al. | |

OTHER PUBLICATIONS

International Search Report and Written Opinion for PCT/US2014/025350, dated Jul. 3, 2014, 7 pages.
Smith, A.R., et al., "Effect of Ligand Structure on the Optical and Electronic Properties of Nanocrystalline PbSe Films", *J Phys Chem C 2012*, 116, pp. 6031-6037.
"Polyanhydride Resins: Why Select PA-18 from Chevron Phillips Chemical?," accessed online at http://www.cpchem.com/bl/spec-chem/en-us/Pages/PolyanhydrideResins.aspx on Oct. 23, 2015, Chevron Phillips Chemical Company, United States (2000-2015).

* cited by examiner

*Primary Examiner* — Robert C Boyle
(74) *Attorney, Agent, or Firm* — Sterne, Kessler, Goldstein & Fox P.L.L.C.

(57) ABSTRACT

Quantum-dot binding ligands with easy to synthesize alkyl-acids are provided. The quantum-dot binding ligands include a multiplicity of carboxy binding ligands in combination with an alkyl backbone, and optionally a solubilizing group. The ligands and coated nanostructures of the present invention are useful for close packed nanostructure compositions, which can have improved quantum confinement and/or reduced cross-talk between nanostructures.

24 Claims, No Drawings

ALKYL-ACID LIGANDS FOR NANOCRYSTALS

CROSS-REFERENCES TO RELATED APPLICATIONS

This application claims priority to U.S. Provisional Application No. 61/783,724, filed Mar. 14, 2013, which is incorporated in its entirety herein for all purposes.

BACKGROUND OF THE INVENTION

High performance down-converting phosphor technologies will play a prominent role in the next generation of visible light emission, including high efficiency solid-state white lighting (SSWL). In addition, such technologies are also applicable to near infrared (NIR) and infrared (IR) light emitting technologies. Down-conversion from ultraviolet (UV) or blue light emitting semiconductor light emitting diodes (LEDs) into blue, red and green wavelengths offers a fast, efficient and cost-effective path for delivering commercially attractive white light sources. Unfortunately, existing rare-earth activated phosphors or halophosphates, which are currently the primary source for solid-state down-conversion, were originally developed for use in fluorescent lamps and cathode ray tubes (CRTs), and therefore have a number of critical shortfalls when it comes to the unique requirements of SSWL. As such, while some SSWL systems are available, poor power efficiency (<20 light lumens/watt (lm/W)), poor color rendering (Color Rendering Index (CRI)<75) and extremely high costs (>$200/kilolumen (klm)) limit this technology to niche markets such as flashlights and walkway lighting.

Furthermore, LEDs often suffer from reduced performance as a result of internal reflection of photons at the chip/coating interface. Typically, LEDs are encapsulated or coated in a polymeric material (which may comprise phosphors) to provide stability to the light-emitting chip. Currently these coatings are made by using an inorganic or organic coating that has a very different refractive index than the base material (i.e., the chip), which results in a detrimental optical effect due to the refractive index mismatch at the interface between the two materials. In addition, the temperature of the LED can reach in excess of 100° C. To allow for the expansion and contraction that can accompany this temperature rise, a compliant polymeric layer (e.g., silicone) is often placed in contact with the chip. In order to provide additional stability to the LED, this compliant layer is often further coated with a hard shell polymer.

The resulting LED structure suffers loss of light at the chip/compliant polymer interface due to the lower refractive index of the polymer coating in relation to the LED. However, if the refractive index of the compliant layer is increased, even greater loss will occur due at the high refractive index/low refractive index interface between the compliant polymer and the hard shell polymer due to internal reflection.

There are several critical factors which result in poor power efficiencies when using traditional inorganic phosphors for SSWL. These include: total internal reflection at the LED-chip and phosphor layer interface resulting in poor light extraction from the LED into the phosphor layer; poor extraction efficiency from the phosphor layer into the surroundings due to scattering of the light generated by the phosphor particles as well as parasitic absorption by the LED chip, metal contacts and housing; broad phosphor emission in the red wavelength range resulting in unused photons emitted into the near-IR; and poor down-conversion efficiency of the phosphors themselves when excited in the blue wavelength range (this is a combination of absorption and emission efficiency). While efficiencies improve with UV excitation, additional loss due to larger Stokes-shifted emission and lower efficiencies of LEDs in the UV versus the blue wavelength range makes this a less appealing solution overall.

As a result, poor efficiency drives a high effective ownership cost. The cost is also significantly impacted from the laborious manufacturing and assembly process to construct such devices, for example the heterogeneous integration of the phosphor-layer onto the LED-chip during packaging (DOE and Optoelectronics Industry Development Association "Light emitting diodes (LEDs) for general illumination," Technology Roadmap (2002)). Historically, blue LEDs have been used in conjunction with various band edge filters and phosphors to generate white light. However, many of the current filters allow photon emission from the blue end of the spectrum, thus limiting the quality of the white LED. The performance of the devices also suffer from poor color rendering due to a limited number of available phosphor colors and color combinations that can be simultaneously excited in the blue. There is a need therefore for efficient nanocomposite filters that can be tailored to filter out specific photon emissions in the visible (especially the blue end), ultraviolet and near infrared spectra.

While some development of organic phosphors has been made for SSWL, organic materials have several insurmountable drawbacks that make them unlikely to be a viable solution for high-efficiency SSWL. These include: rapid photodegradation leading to poor lifetime, especially in the presence of blue and near-UV light; low absorption efficiency; optical scattering, poor refractive index matching at the chip-interface, narrow and non-overlapping absorption spectra for different color phosphors making it difficult or impossible to simultaneously excite multiple colors; and broad emission spectra. There exists a need therefore for polymeric layers that aid production of high quality, high intensity, white light. Surprisingly, the present invention meets this and other needs.

BRIEF SUMMARY OF THE INVENTION

In some embodiments, the present invention provides a quantum dot binding ligand having the formula:

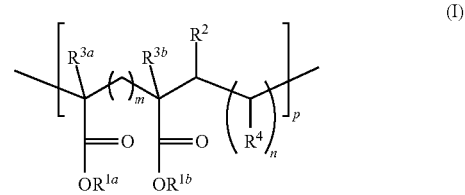

wherein each $R^{1a}$, $R^{1b}$, $R^2$ and $R^4$ of formula I can independently be H, $C_{1-20}$ alkyl, $C_{1-20}$ heteroalkyl, $C_{2-20}$ alkenyl, $C_{2-20}$ alkynyl, cycloalkyl or aryl. Each $R^{3a}$ and $R^{3b}$ of formula I can independently be H or $C_{1-6}$ alkyl. Subscripts m and n of formula I are each independently 0 or 1, such that m+n is 1. Subscript p of formula I can be an integer of from 5 to about 500. The quantum-dot binding ligands of formula I are those wherein when subscript m is 0, then at least one of $R^{1a}$ and $R^{1b}$ is H, and $R^2$ can be $C_{8-20}$ alkyl, $C_{8-20}$ heteroalkyl, $C_{8-20}$ alkenyl, $C_{8-20}$ alkynyl, cycloalkyl or aryl, and when subscript m is 1, then $R^{1a}$ and $R^2$ are both H and $R^{1b}$ can be $C_{8-20}$ alkyl, $C_{8-20}$ heteroalkyl, $C_{8-20}$ alkenyl, $C_{8-20}$ alkynyl, cycloalkyl or aryl.

In some embodiments, the present invention provides a composition of a quantum dot binding-ligand of the present invention, and a first population of light emitting quantum dots (QDs).

DETAILED DESCRIPTION OF THE INVENTION

I. General

The present invention provides alkyl-carboxy polymers for binding to quantum dots. The ligands are easy to synthesize and provide greater stability for the quantum dots due to a plurality of carboxy binding groups.

II. Definitions

"Carboxy binding group" refers to a carboxylic acid group: C(O)OH.

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{1-12}$, $C_{1-14}$, $C_{1-16}$, $C_{1-18}$, $C_{1-20}$, $C_{8-20}$, $C_{12-20}$, $C_{14-20}$, $C_{16-20}$, and $C_{18-20}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Other alkyl groups include octane, nonane, decane, undecane, dodecane, tridecane, tetradecane, pentadecane, hexadecane, heptadecane, octadecane, nonadecane, and icosane. Alkyl groups can be substituted or unsubstituted.

"Long-chain alkyl groups" are alkyl groups, as defined above, having at least 8 carbon chain atoms. Long-chain alkyl groups can include any number of carbons, such as $C_{8-20}$, $C_{12-20}$, $C_{14-20}$, $C_{16-20}$, or $C_{18-20}$. Representative groups include, but are not limited to, octane, nonane, decane, undecane, dodecane, tridecane, tetradecane, pentadecane, hexadecane, heptadecane, octadecane, nonadecane, and icosane. Long-chain alkyl groups can also be substituted with silane groups.

"Alkylene" refers to a straight or branched, saturated, aliphatic radical having the number of carbon atoms indicated, and linking at least two other groups. The alkylene can link to 2, 3, 4, or more groups, and be divalent, trivalent, tetravalent, or multi-valent. The groups linked to the alkylene can be linked to the same atom or different atoms of the alkylene group. For instance, a straight chain alkylene can be the bivalent radical of $-(CH_2)_n-$, where n is 1, 2, 3, 4, 5 or 6. Representative alkylene groups include, but are not limited to, methylene, ethylene, propylene, isopropylene, butylene, isobutylene, sec-butylene, pentylene and hexylene. Alkylene groups can be substituted or unsubstituted.

"Heteroalkyl" refers to an alkyl group of any suitable length and having from 1 to 5 heteroatoms such as N, O and S. Additional heteroatoms can also be useful, including, but not limited to, B, Al, Si and P. The heteroatoms can also be oxidized, such as, but not limited to, $-S(O)-$ and $-S(O)_2-$. For example, heteroalkyl can include ethers (ethyleneoxy and poly(ethyleneoxy)), thioethers and alkylamines. The heteroatom portion of the heteroalkyl can replace a hydrogen of the alkyl group to form a hydroxy, thio or amino group. Alternatively, the heteroatom portion can be the connecting atom, or be inserted between two carbon atoms.

"Long-chain heteroalkyl groups" are heteroalkyl groups, as defined above, having at least 8 chain atoms. Long-chain heteroalkyl groups can include any number of chain atoms, such as $C_{8-20}$, $C_{12-20}$, $C_{14-20}$, $C_{16-20}$, or $C_{18-20}$.

"Heteroalkylene" refers to a heteroalkyl group, as defined above, linking at least two other groups. The two or more moieties linked to the heteroalkylene can be linked to the same atom or different atoms of the heteroalkylene.

"Alkenyl" refers to a straight chain or branched hydrocarbon having at least 2 carbon atoms and at least one double bond. Alkenyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Alkenyl groups can have any suitable number of double bonds, including, but not limited to, 1, 2, 3, 4, 5 or more. Examples of alkenyl groups include, but are not limited to, vinyl(ethenyl), propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can be substituted or unsubstituted.

"Long-chain alkenyl groups" are alkenyl groups, as defined above, having at least 8 carbon chain atoms. Long-chain alkenyl groups can include any number of carbons, such as $C_{8-20}$, $C_{12-20}$, $C_{14-20}$, $C_{16-20}$, or $C_{18-20}$. Representative groups include, but are not limited to, octene, nonene, decene, undecene, dodecene, tridecene, tetradecene, pentadecene, hexadecene, heptadecene, octadecene, nonadecene, and icosene. The long-chain alkenyl groups can have one or more alkene groups.

"Alkynyl" refers to either a straight chain or branched hydrocarbon having at least 2 carbon atoms and at least one triple bond. Alkynyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatrienyl. Alkynyl groups can be substituted or unsubstituted.

"Long-chain alkynyl groups" are alkynyl groups, as defined above, having at least 8 carbon chain atoms. Long-chain alkynyl groups can include any number of carbons, such as $C_{8-20}$, $C_{12-20}$, $C_{14-20}$, $C_{16-20}$, or $C_{18-20}$. Representative groups include, but are not limited to, octyne, nonyne, decyne, undecyne, dodecyne, tridecyne, tetradecyne, pentadecyne, hexadecyne, heptadecyne, octadecyne, nonadecyne, and icosene. The long-chain alkynyl groups can have one or more alkyne groups.

"Cycloalkyl" refers to a saturated or partially unsaturated, monocyclic, fused bicyclic or bridged polycyclic ring assembly containing from 3 to 12 ring atoms, or the number of atoms indicated. Cycloalkyl can include any number of carbons, such as $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, $C_{3-12}$, $C_{6-10}$, or $C_{6-12}$ Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbornane, [2.2.2]bicyclooctane, decahydronaphthalene and adamantane. Cycloalkyl groups can also be partially unsaturated, having one or more double or triple bonds in the ring. Representative cycloalkyl groups that are partially unsaturated include, but are not limited to, cyclobutene, cyclopentene, cyclohexene, cyclohexadiene (1,3- and 1,4-isomers), cycloheptene, cycloheptadiene, cyclooctene, cyclooctadiene (1,3-, 1,4- and 1,5-isomers), norbornene, and norbornadiene. When cycloalkyl is a saturated monocyclic $C_{3-8}$ cycloalkyl, exemplary groups include, but are not limited to cyclopropyl, cyclobutyl, cyclopentyl, cyclohexyl, cycloheptyl and cyclooctyl. When cycloalkyl is a saturated monocyclic $C_{3-6}$ cycloalkyl, exemplary groups include, but are not limited to cyclopropyl, cyclobutyl, cyclopentyl, and cyclohexyl. Cycloalkyl groups can be substituted or unsubstituted.

"Alkyl-cycloalkyl" refers to a radical having an alkyl component and a cycloalkyl component, where the alkyl component links the cycloalkyl component to the point of attachment. The alkyl component is as defined above, except that the alkyl component is at least divalent, an alkylene, to link to the cycloalkyl component and to the point of attachment. In some instances, the alkyl component can be absent. The alkyl component can include any number of carbons, such as $C_{1-6}$, $C_{1-2}$, $C_{1-3}$, $C_{1-4}$, $C_{1-5}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. The cycloalkyl component is as defined within. Exemplary alkyl-cycloalkyl groups include, but are not limited to, methyl-cyclopropyl, methyl-cyclobutyl, methyl-cyclopentyl and methyl-cyclohexyl.

"Aryl" refers to an aromatic ring system having any suitable number of ring atoms and any suitable number of rings. Aryl groups can include any suitable number of ring atoms, such as, 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted.

"Alkyl-aryl" refers to a radical having an alkyl component and an aryl component, where the alkyl component links the aryl component to the point of attachment. The alkyl component is as defined above, except that the alkyl component is at least divalent, an alkylene, to link to the aryl component and to the point of attachment. The alkyl component can include any number of carbons, such as $C_{0-6}$, $C_{1-2}$, $C_{1-3}$, $C_{1-4}$, $C_{1-5}$, $C_{1-6}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. In some instances, the alkyl component can be absent. The aryl component is as defined above. Examples of alkyl-aryl groups include, but are not limited to, benzyl and ethylbenzene. Alkyl-aryl groups can be substituted or unsubstituted.

"Silane" or "silyl" refers to a silicon atom having several substituents, and generally having the formula —$SiR_3$. The R groups attached to the silicon atom can be any suitable group, including, but not limited to, hydrogen, halogen and alkyl. Moreover, the R groups can be the same or different.

"Forming a reaction mixture" refers to combining at least two components in a container under conditions suitable for the components to react with one another and form a third component.

"Quantum dot" or "nanocrystal" refers to nanostructures that are substantially monocrystalline. A nanocrystal has at least one region or characteristic dimension with a dimension of less than about 500 nm, and down to on the order of less than about 1 nm. As used herein, when referring to any numerical value, "about" means a value of ±10% of the stated value (e.g. about 100 nm encompasses a range of sizes from 90 nm to 110 nm, inclusive). The terms "nanocrystal," "quantum dot," "nanodot," and "dot," are readily understood by the ordinarily skilled artisan to represent like structures and are used herein interchangeably. The present invention also encompasses the use of polycrystalline or amorphous nanocrystals.

III. Quantum Dot Binding Ligands

The present invention provides alkyl-carboxy polymers for binding to quantum dots. The ligands are easy to synthesize and provide greater stability for the quantum dots due to a plurality of carboxy binding groups.

In some embodiments, the present invention provides a quantum dot binding ligand having the formula:

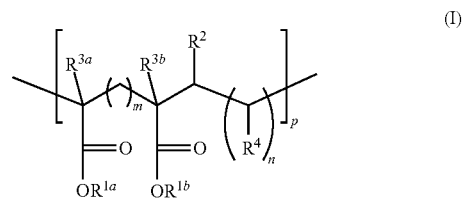

(I)

wherein each $R^{1a}$, $R^{1b}$, $R^2$ and $R^4$ of formula I can independently be H, $C_{1-20}$ alkyl, $C_{1-20}$ heteroalkyl, $C_{2-20}$ alkenyl, $C_{2-20}$ alkynyl, cycloalkyl or aryl. Each $R^{3a}$ and $R^{3b}$ of formula I can independently be H or $C_{1-6}$ alkyl. Subscripts m and n of formula I are each independently 0 or 1, such that m+n is 1. Subscript p of formula I can be an integer of from 5 to about 500. The quantum-dot binding ligands of formula I are those wherein when subscript m is 0, then at least one of $R^{1a}$ and $R^{1b}$ is H, and $R^2$ can be $C_{8-20}$ alkyl, $C_{8-20}$ heteroalkyl, $C_{8-20}$ alkenyl, $C_{8-20}$ alkynyl, cycloalkyl or aryl, and when subscript m is 1, then $R^{1a}$ and $R^2$ are both H and $R^{1b}$ can be $C_{8-20}$ alkyl, $C_{8-20}$ heteroalkyl, $C_{8-20}$ alkenyl, $C_{8-20}$ alkynyl, cycloalkyl or aryl.

In some embodiments, the $R^{3a}$, $R^{3b}$ and $R^4$ groups are all H. In other embodiments, the quantum dot binding ligand of formula I has the structure:

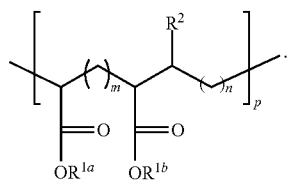

The $R^{1a}$, $R^{1b}$ and $R^2$ groups can be any suitable group, such that at least one can be hydrogen and at least one can be other than hydrogen, such as a solubilizing group. In some embodiments, at least one of $R^{1a}$, $R^{1b}$ and $R^2$ can be H, and at least one of $R^{1a}$, $R^{1b}$ and $R^2$ can independently be $C_{8-20}$ alkyl, $C_{8-20}$ heteroalkyl, $C_{8-20}$ alkenyl, $C_{8-20}$ alkynyl, cycloalkyl or aryl. In other embodiments, at least one of $R^{1a}$, $R^{1b}$ and $R^2$ can be $C_{8-20}$ alkyl. In some other embodiments, at least one of $R^{1a}$, $R^{1b}$ and $R^2$ can independently be octane, nonane, decane, undecane, dodecane, tridecane, tetradecane, pentadecane, hexadecane, heptadecane, octadecane, nonadecane, or icosane. In still other embodiments, at least one of $R^{1a}$, $R^{1b}$ and $R^2$ can independently be tetradecane, hexadecane, octadecane, or icosane.

Subscript p can be any suitable number in the quantum dot binding-ligands of the present invention. For example, subscript p can be from about 1 to about 100, or from about 5 to about 100, or from about 5 to about 50, or from about 10 to about 50, or from about 10 to about 25, or from about 10 to about 100, or from about 25 to about 100. Alternatively, subscript p can be about 5, 10, 15, 20, 25, 30, 40, 50, 60, 70, 80, 90 or about 100. In some embodiments, subscript p can be from about 10 to about 100.

Subscripts m and n can be any suitable combination of 0 or 1, such that the sum of subscripts m and n is 1. In some embodiments, subscript m can be 0 and subscript n can be 1. When subscript m is 0 and subscript n is 1, the quantum dot binding ligand of formula I can have the following structure:

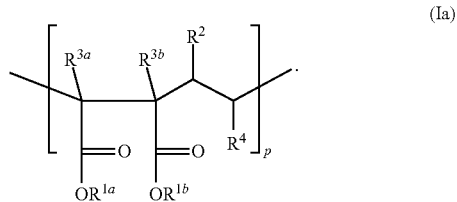
(Ia)

In some embodiments, when subscript m is 0 and subscript n is 1, the quantum dot binding ligand of formula I can have the structure:

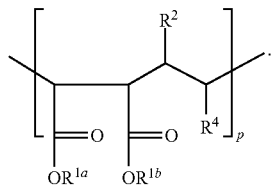

The $R^{1a}$, $R^{1b}$, $R^2$ and $R^4$ groups can be any suitable group, such that at least one can be hydrogen and at least one can be other than hydrogen, such as a solubilizing group. In some embodiments, at least one of $R^{1a}$, $R^{1b}$, $R^2$ and $R^4$ can be H, and at least one of $R^{1a}$, $R^{1b}$, $R^2$ and $R^4$ can independently be a solubilizing group such as $C_{8-20}$ alkyl, $C_{8-20}$ heteroalkyl, $C_{8-20}$ alkenyl, $C_{8-20}$ alkynyl, cycloalkyl or aryl. In other embodiments, both of $R^{1a}$ and $R^{1b}$ can be hydrogen, and one of $R^2$ and $R^4$ can be a solubilizing group. In some other embodiments, $R^{1a}$, $R^{1b}$ and $R^4$ are hydrogen, and $R^2$ can be a solubilizing group. In some embodiments, the quantum dot binding ligand of formula I has the structure:

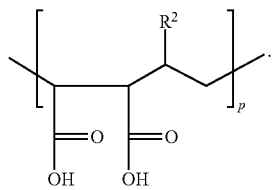

When $R^2$ is a solubilizing group, $R^2$ can be any suitable solubilizing group. In some embodiments, $R^2$ can be $C_{8-20}$ alkyl, $C_{8-20}$ heteroalkyl, $C_{8-20}$ alkenyl, $C_{8-20}$ alkynyl, cycloalkyl or aryl. In other embodiments, $R^2$ can be $C_{8-20}$ alkyl. In some other embodiments, $R^2$ can be octane, nonane, decane, undecane, dodecane, tridecane, tetradecane, pentadecane, hexadecane, heptadecane, octadecane, nonadecane, or icosane. In still other embodiments, $R^2$ can be tetradecane, hexadecane, octadecane, or icosane.

The quantum dot binding ligands of formula Ia can be prepared by methods known to one of skill in the art. For example, maleic anhydride and an alkene can be copolymerized by known methods, followed by hydrolysis of the anhydride. Thus, an alternating copolymer is prepared having two carboxy binding ligands ($R^{1a}$=$R^{1b}$=H) and an alkyl solubilizing group ($R^2$).

In some embodiments, when subscript m is 1 and subscript n is 0, the quantum dot binding ligand of formula I can have the structure:

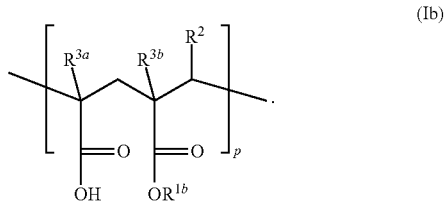
(Ib)

The $R^{1b}$, $R^2$, $R^{3a}$ and $R^{3b}$ groups of formula Ib can be any suitable group, wherein at least one can be other than hydrogen, such as a solubilizing group. The $R^{3a}$ and $R^{3b}$ groups can be any suitable group. In some embodiments, each $R^{3a}$ and $R^{3b}$ group can independently be H or $C_{1-6}$ alkyl. In other embodiments, each $R^{3a}$ and $R^{3b}$ group can independently be H or $C_{1-3}$ alkyl. In some other embodiments, each $R^{3a}$ and $R^{3b}$ group can independently be H, methyl, ethyl, or propyl. In still other embodiments, each $R^{3a}$ and $R^{3b}$ group can be H. In yet other embodiments, each $R^{3a}$ and $R^{3b}$ group can be methyl.

In some embodiments, the quantum dot binding ligand of formula I can have the structure:

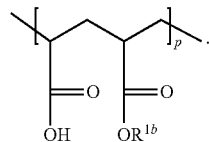

When $R^{1b}$ is a solubilizing group, $R^{1b}$ can be any suitable solubilizing group. In some embodiments, $R^{1b}$ can be $C_{8-20}$ alkyl, $C_{8-20}$ heteroalkyl, $C_{8-20}$ alkenyl, $C_{8-20}$ alkynyl, cycloalkyl or aryl. In other embodiments, $R^{1b}$ can be $C_{8-20}$ alkyl. In some other embodiments, $R^{1b}$ can be octane, nonane, decane, undecane, dodecane, tridecane, tetradecane, pentadecane, hexadecane, heptadecane, octadecane, nonadecane, or icosane. In still other embodiments, $R^2$ can be tetradecane, hexadecane, octadecane, or icosane.

The quantum dot binding ligands of formula Ib can be prepared by any method known to one of skill in the art. For example, polyacrylic acid can be prepared by known methods or obtained from commercial sources, followed by partial esterification with an alcohol to afford the copolymer of formula Ib. The esterification can be performed chemically or enzymatically (see U.S. Pat. No. 6,924,129, incorporated by reference in its entirety herein).

IV. Compositions

The quantum dot binding-ligands of the present invention can be complexed to a quantum dot (QD). In some embodiments, the present invention provides a composition of a quantum dot binding-ligand of the present invention, and a first population of light emitting quantum dots (QDs).

Quantum Dots

Typically, the region of characteristic dimension will be along the smallest axis of the structure. The QDs can be substantially homogenous in material properties, or in certain embodiments, can be heterogeneous. The optical properties of QDs can be determined by their particle size, chemical or surface composition; and/or by suitable optical testing available in the art. The ability to tailor the nanocrystal size in the range between about 1 nm and about 15 nm enables photo-emission coverage in the entire optical spectrum to offer great versatility in color rendering. Particle encapsulation offers robustness against chemical and UV deteriorating agents.

Additional exemplary nanostructures include, but are not limited to, nanowires, nanorods, nanotubes, branched nanostructures, nanotetrapods, tripods, bipods, nanoparticles, and similar structures having at least one region or characteristic dimension (optionally each of the three dimensions) with a dimension of less than about 500 nm, e.g., less than about 200 nm, less than about 100 nm, less than about 50 nm, or even less than about 20 nm or less than about 10 nm. Typically, the region or characteristic dimension will be along the smallest axis of the structure. Nanostructures can be, e.g., substantially crystalline, substantially monocrystalline, polycrystalline, amorphous, or a combination thereof.

QDs (or other nanostructures) for use in the present invention can be produced using any method known to those skilled in the art. For example, suitable QDs and methods for forming suitable QDs include those disclosed in: U.S. Pat. No. 6,225,198, U.S. Pat. No. 6,207,229, U.S. Pat. No. 6,322,901, U.S. Pat. No. 6,872,249, U.S. Pat. No. 6,949,206, U.S. Pat. No. 7,572,393, U.S. Pat. No. 7,267,865, U.S. Pat. No. 7,374,807, US Patent Publication No. 2008/0118755, filed Dec. 9, 2005, and U.S. Pat. No. 6,861,155, each of which is incorporated by reference herein in its entirety.

The QDs (or other nanostructures) for use in the present invention can be produced from any suitable material, suitably an inorganic material, and more suitably an inorganic conductive or semiconductive material. Suitable semiconductor materials include any type of semiconductor, including group II-VI, group III-V, group IV-VI and group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, (Al, Ga, In)$_2$ (S, Se, Te)$_3$, $Al_2CO_3$, and appropriate combinations of two or more such semiconductors.

In some embodiments, the semiconductor nanocrystals or other nanostructures can also include a dopant, such as a p-type dopant or an n-type dopant. The nanocrystals (or other nanostructures) useful in the present invention can also include II-VI or III-V semiconductors. Examples of II-VI or III-V semiconductor nanocrystals and nanostructures include any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table. Other suitable inorganic nanostructures include metal nanostructures. Suitable metals include, but are not limited to, Ru, Pd, Pt, Ni, W, Ta, Co, Mo, Ir, Re, Rh, Hf, Nb, Au, Ag, Ti, Sn, Zn, Fe, FePt, and the like.

While any method known to the ordinarily skilled artisan can be used to create nanocrystal phosphors, suitably, a solution-phase colloidal method for controlled growth of inorganic nanomaterial phosphors is used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J. Am. Chem. Soc. 115:8706 (1993), the disclosures of which are incorporated by reference herein in their entireties. This manufacturing process technology leverages low cost processability without the need for clean rooms and expensive manufacturing equipment. In these methods, metal precursors that undergo pyrolysis at high temperature are rapidly injected into a hot solution of organic surfactant molecules. These precursors break apart at elevated temperatures and react to nucleate nanocrystals. After this initial nucleation phase, a growth phase begins by the addition of monomers to the growing crystal. The result is freestanding crystalline nanoparticles in solution that have an organic surfactant molecule coating their surface.

Utilizing this approach, synthesis occurs as an initial nucleation event that takes place over seconds, followed by crystal growth at elevated temperature for several minutes. Parameters such as the temperature, types of surfactants present, precursor materials, and ratios of surfactants to monomers can be modified so as to change the nature and progress of the reaction. The temperature controls the structural phase of the nucleation event, rate of decomposition of precursors, and rate of growth. The organic surfactant molecules mediate both solubility and control of the nanocrystal shape. The ratio of surfactants to monomer, surfactants to each other, monomers to each other, and the individual concentrations of monomers strongly influence the kinetics of growth.

In semiconductor nanocrystals, photo-induced emission arises from the band edge states of the nanocrystal. The band-edge emission from luminescent nanocrystals competes with radiative and non-radiative decay channels originating from surface electronic states. X. Peng, et al., J. Am. Chem. Soc. 30:7019-7029 (1997). As a result, the presence of surface defects such as dangling bonds provide non-radiative recombination centers and contribute to lowered emission efficiency. An efficient and permanent method to passivate and remove the surface trap states is to epitaxially grow an inorganic shell material on the surface of the nanocrystal. X. Peng, et al., J. Am. Chem. Soc. 30:7019-7029 (1997). The shell material can be chosen such that the electronic levels are type I with respect to the core material (e.g., with a larger bandgap to provide a potential step localizing the electron and hole to the core). As a result, the probability of non-radiative recombination can be reduced.

Core-shell structures are obtained by adding organometallic precursors containing the shell materials to a reaction mixture containing the core nanocrystal. In this case, rather than a nucleation-event followed by growth, the cores act as the nuclei, and the shells grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials.

Exemplary materials for preparing core-shell luminescent nanocrystals include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such materials. Exemplary core-shell luminescent nanocrystals for use in the practice of the present invention include, but are not limited to, (represented as Core/Shell), CdSe/ZnS, InP/ZnS, PbSe/PbS, CdSe/CdS, CdTe/CdS, CdTe/ZnS, as well as others.

In some embodiments, CdSe is used as the nanocrystal material, due to the relative maturity of the synthesis of this material. Due to the use of a generic surface chemistry, it is also possible to substitute non-cadmium-containing nanocrystals. Exemplary luminescent nanocrystal materials include CdSe or ZnS, including core/shell luminescent nanocrystals comprising CdSe/CdS/ZnS, CdSe/ZnS, CdSeZn/CdS/ZnS, CdSeZn/ZnS, InP/ZnS, PbSe/PbS, CdSe/CdS, CdTe/CdS or CdTe/ZnS. Most preferably, the quantum dots of the present invention can include core-shell QDs having a core including CdSe and at least one encapsulating shell layer including CdS or ZnS. In other embodiments, InP is used as the nanocrystal material. In some embodiments, the quantum dot can be CdSe, CdTe or InP.

The luminescent nanocrystals can be made from a material impervious to oxygen, thereby simplifying oxygen barrier requirements and photostabilization of the QDs in the QD phosphor material. In some embodiments, the luminescent nanocrystals can be coated with one or more quantum dot binding-ligand of the present invention and dispersed in an organic polymeric matrix having one or more matrix materials, as discussed in more detail below. The luminescent nanocrystals can be further coated with one or more inorganic layers having one or more material such as a silicon oxide, an aluminum oxide, or a titanium oxide (e.g., $SiO_2$, $Si_2O_3$, $TiO_2$, or $Al_2O_3$), to hermetically seal the QDs.

Matrix Materials

Generally, the polymeric ligand is bound to a surface of the nanostructure. Not all of the ligand material in the composition need be bound to the nanostructure, however. The polymeric ligand can be provided in excess, such that some molecules of the ligand are bound to a surface of the nanostructure and other molecules of the ligand are not bound to the surface of the nanostructure.

The phosphor material of the present invention further comprises a matrix material in which the QDs are embedded or otherwise disposed. The matrix material can be any suitable host matrix material capable of housing the QDs. Suitable matrix materials will be chemically and optically compatible with back-lighting unit (BLU) components, including the QDs and any surrounding packaging materials or layers. Suitable matrix materials include non-yellowing optical materials which are transparent to both the primary and secondary light, thereby allowing for both primary and secondary light to transmit through the matrix material. In preferred embodiments, the matrix material completely surrounds the QDs and provides a protective barrier which prevents deterioration of the QDs caused by environmental conditions such as oxygen, moisture, and temperature. The matrix material can be flexible in applications where a flexible or moldable QD film is desired. Alternatively, the matrix material can include a high-strength, non-flexible material.

Preferred matrix materials will have low oxygen and moisture permeability, exhibit high photo- and chemical-stability, exhibit favorable refractive indices, and adhere to the barrier or other layers adjacent the QD phosphor material, thus providing an air-tight seal to protect the QDs. Preferred matrix materials will be curable with UV or thermal curing methods to facilitate roll-to-roll processing. Thermal curing is most preferred.

Suitable matrix materials for use in QD phosphor material of the present invention include polymers and organic and inorganic oxides. Suitable polymers for use in the matrixes of the present invention include any polymer known to the ordinarily skilled artisan that can be used for such a purpose. In suitable embodiments, the polymer will be substantially translucent or substantially transparent. Suitable matrix materials include, but are not limited to, epoxies, acrylates, norbornene, polyethylene, poly(vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with bifunctional monomers, such as divinylbenzene; cross-linkers suitable for cross-linking ligand materials, epoxides which combine with ligand amines (e.g., APS or PEI ligand amines) to form epoxy, and the like.

The QDs used the present invention can be embedded in a polymeric matrix (or other matrix material) using any suitable method, for example, mixing the nanocrystals in a polymer and casting a film, mixing the nanocrystals with monomers and polymerizing them together, mixing the nanocrystals in a sol-gel to form an oxide, or any other method known to those skilled in the art. As used herein, the term "embedded" is used to indicate that the luminescent nanocrystals are enclosed or encased within the polymer that makes up the majority component of the matrix. It should be noted that luminescent nanocrystals are suitably uniformly distributed throughout the matrix, though in further embodiments they can be distributed according to an application-specific uniformity distribution function.

The composition optionally includes a plurality or population of the nanostructures, e.g., with bound ligand. The composition optionally includes a solvent, in which the nanostructure(s) and ligand can be dispersed. As noted, the nanostructures and ligand can be incorporated into a matrix to form a polymer layer or nanocomposite (e.g., a silicone matrix formed from the ligand). Thus, the composition can also include a crosslinker and/or an initiator. Suitable crosslinkers include organic or polymeric compounds with two or more functional groups (e.g., two, three, or four) that can react with amine groups (or other groups on the ligand) to form covalent bonds. Such functional groups include, but are not limited to, isocyanate, epoxide (also called epoxy), succinic anhydride or other anhydride or acid anhydride, and methyl ester groups, e.g., on a silicone, hydrocarbon, or other molecule. In one class of embodiments, the crosslinker is an epoxy crosslinker, e.g., an epoxycyclohexyl or epoxypropyl crosslinker (e.g., compounds A-C or D-G in Table 1, respectively). The reactive groups on the crosslinker can be pendant and/or terminal (e.g., compounds B and D or compounds A, C, and E-G in Table 1, respectively). The crosslinker is optionally an epoxy silicone crosslinker, which can be, e.g., linear or branched. In certain embodiments, the crosslinker is a linear epoxycyclohexyl silicone or a linear epoxypropyl (glycidyl) silicone. A number of exemplary crosslinkers are listed in Table 1. Suitable crosslinkers are commercially available. For example, compounds H-K are available from Aldrich and compounds A-G are available from Gelest, Inc., e.g., with a formula weight of about 900-1100 for compound A as product no. DMS-EC13, with a formula weight of about 18,000 and a molar percentage of 3-4% for m for compound B as product no. ECMS-327, with a formula weight of about 8000, m≈6, and n≈100 for compound D as product no. EMS-622, and as product no. DMS-E09 for compound E.

TABLE 1

Exemplary crosslinkers.

A
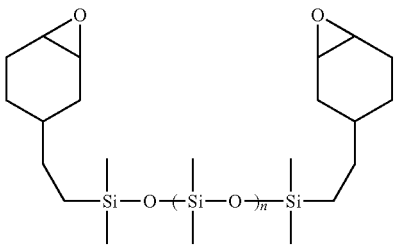
where n is a positive integer

B
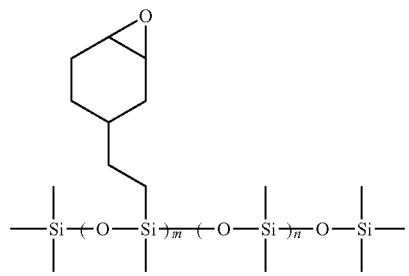
where m and n are positive integers

C
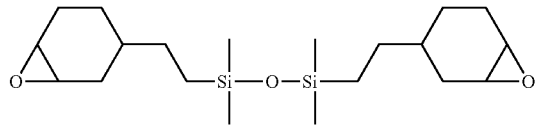

D
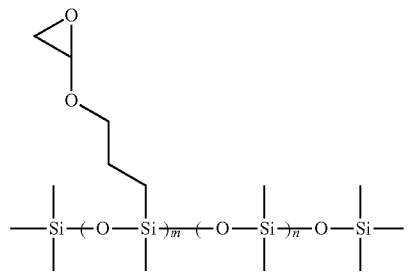
where m and n are positive integers (e.g., m≈6 and n≈100)

E
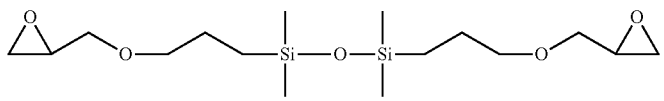 [SMILES: C[Si](C)(CCCOCC1CO1)O[Si](C)(C)CCCOCC1CO1]

F
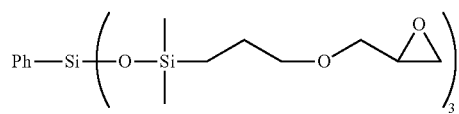
where Ph represents a phenyl group

TABLE 1-continued
Exemplary crosslinkers.
G 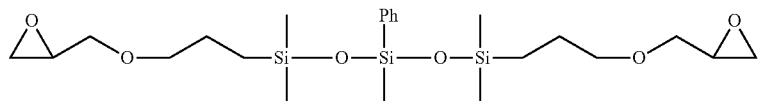
where Ph represents a phenyl group
H 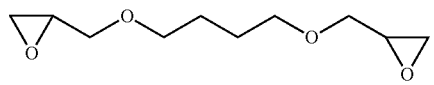
1,4-butanediol diglycidyl ether
I 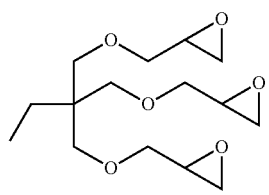 [SMILES: CCC(COCC1CO1)(COCC1CO1)COCC1CO1]
trimethytlolpropane triglycidyl ether
J 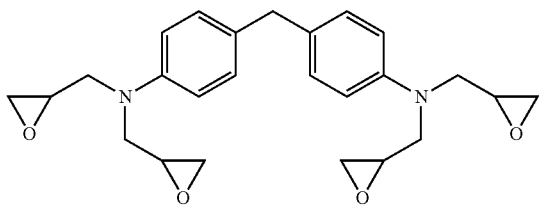 [SMILES: c1cc(N(CC2CO2)CC2CO2)ccc1Cc1ccc(N(CC2CO2)CC2CO2)cc1]
4,4'-methylenebis(N,N-diglycidylaniline)
K 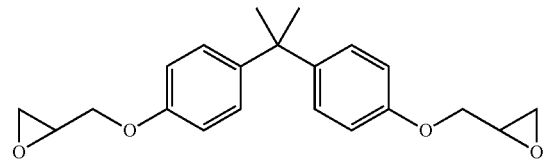 [SMILES: CC(C)(c1ccc(OCC2CO2)cc1)c1ccc(OCC2CO2)cc1]
bisphenol A diglycidyl ether
L 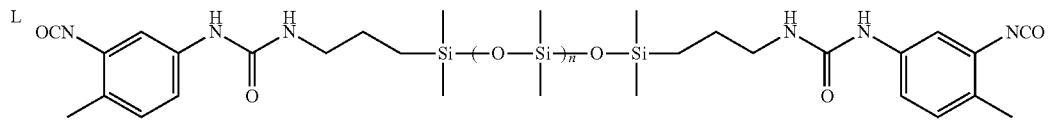
M 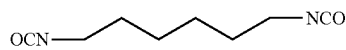
1,6-diisocyanate
N 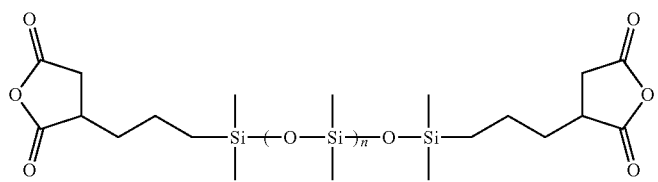
where n is a positive integer

TABLE 1-continued

Exemplary crosslinkers.

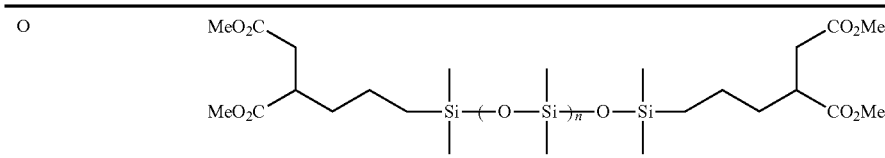

where n is a positive integer and where Me represents a methyl group

The quantum dot compositions and films prepared using the quantum dot binding-ligands of the present invention are useful in a variety of light emitting devices, quantum dot lighting devices and quantum dot-based backlighting units. Representative devices are well known to those of skill in the art and can be found, for example, in US Publication Nos. 2010/0167011 and 2012/0113672, and U.S. Pat. Nos. 7,750, 235 and 8,053,972.

The quantum dot compositions of the present invention can be used to form a lighting device such as a backlighting unit (BLU). A typical BLU can include a QD film sandwiched between two barrier layers. QD films of the present invention can include a single quantum dot and a single quantum-dot binding-ligand, or a plurality of quantum dots and a plurality of quantum-dot binding-ligands. For example, a QD film of the present invention can include a cadmium quantum dot, such as CdS, CdTe, CdSe, CdSe/CdS, CdTe/CdS, CdTe/ZnS, CdSe/CdS/ZnS, CdSe/ZnS, CdSeZn/CdS/ZnS, or CdSeZn/ZnS, and a quantum-dot binding ligand having amine binding groups. The QD films of the present invention can include an InP quantum dot, such as InP or InP/ZnS, and a quantum-dot binding ligand having carboxy binding groups.

In some embodiments, the QD films of the present invention include both cadmium and indium containing quantum dots. When both cadmium and indium containing quantum dots are present, the QD film can include a first film containing the cadmium quantum dots and a second film containing the indium quantum dots. These films can then be stacked one on top of another to form a layered film. In some embodiments, a barrier film or other type of film can be stacked in between each of the cadmium and indium films. In other embodiments, the cadmium and indium quantum dots are mixed together in a single QD film with their respective quantum-dot binding-ligands.

Mixed QD films, with either a single layer or multi-layer film, have the advantage of reducing the amount of cadmium in the system. For example, the cadmium can be reduced below 300 ppm, 200, 100, 75, 50 or 25 ppm. In some embodiments, the QD film contains less than about 100 ppm cadmium. In other embodiments, the QD film contains less than about 50 ppm.

V. Examples
Example 1
Preparation of Poly(Maleic Acid-alt-1-Octadecene)

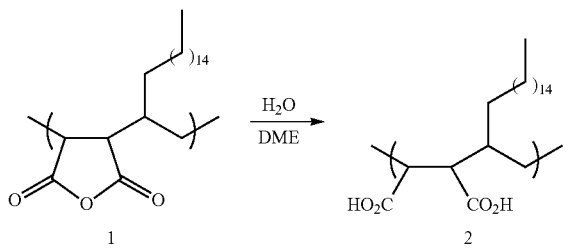

Mn 20-25K
Mn is 57 to 71 repeat units
PN: PA-18 LV Low Color
(Chevron Phillips)

General Methods.

The 2,5-furandione, polymer with 1-octadecene (PN: PA-18 LV Low Color) was obtained from Chevron Phillips. FTIR analysis was obtained on a Nicolet 7200 FTIR equipped with an attenuated total reflectance (ATR) sampling accessory.

Synthesis of Poly(Maleic Acid-alt-1-Octadecene)

To a 250 mL, 3 neck RBF equipped with a reflux condenser and thermocouple positioned to measure the reaction solution temperature was added the co-polymer 1 (25 g, 71.3 mmoles of repeat units with fwt of 350.5) and water 64.2 g, 64.2 mL, 3.56 moles). The thermocouple was connected to a heating mantle and temperature controller that was used to maintain the desired temperature in the reaction solution. FTIR analysis of the starting anhydride co-polymer revealed that it was already mostly carboxylic acid. The reaction flask was stirred while quickly being placed under vacuum to about 10 torr and then back flushed with nitrogen. Then the reaction solution was heated to 70 C overnight. About 30 minutes after attaining 70 C the material in the flask had formed a white ball but after being heated for about 16 h the ball had disappeared and the solution was opaque and gave the appearance of milk.

A sample was prepared for analysis by removal of the volatiles and analyzed by FTIR that determined the reaction had gone to completion. The reflux condenser was replaced by a stopper and the volatiles removed by vacuum transfer using a supplementary trap cooled with dry ice/ethanol overnight. The solids were broken up to facilitate drying and the resulting powder was vacuumed to a pressure of less than 20 mtorr overnight.

Analysis of alt-maleic anhydride octadecene co-polymer (1)

IR ($cm^{-1}$, diamond): 3600 to 2300 broad (carboxylic acid OH), 2921 s, 2851 s (sp3 C—H), 1859 w, 1778 m (symm. & asymm. anhydride C=O), 1705 s (carboxylic acid C$\alpha$O).

Analysis of alt-maleic acid octadecene co-polymer (2)

IR ($cm^{-1}$, diamond): 3600 to 2300 broad (carboxylic acid OH), 2921 s, 2851 s (sp3 C—H), 1705 s (carboxylic acid C=O).

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A composition comprising:
(a) a quantum dot binding-ligand having the formula:

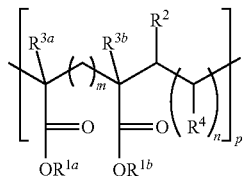
(I)

wherein
each $R^{1a}$, $R^{1b}$, $R^2$ and $R^4$ is independently selected from the group consisting of H, $C_{1-20}$ alkyl, $C_{1-20}$ heteroalkyl, $C_{2-20}$ alkenyl, $C_{2-20}$ alkynyl, and cycloalkyl; each $R^{3a}$ and $R^{3b}$ is independently selected from the group consisting of H and $C_{1-6}$ alkyl; subscripts m and n are each independently 0 or 1, such that m+n is 1; and subscript p is an integer of from 5 to 500; wherein
when subscript m is 0, then one of $R^{1a}$ and $R^{1b}$ is H, and $R^2$ and the other of $R^{1a}$ and $R^{1b}$ are selected from the group consisting of $C_{8-20}$ alkyl, $C_{8-20}$ heteroalkyl, $C_{8-20}$ alkenyl, $C_{8-20}$ alkynyl, and cycloalkyl;
when subscript m is 1, then $R^{1a}$ and $R^2$ are both H and $R^{1b}$ is selected from the group consisting of $C_{8-20}$ alkyl, $C_{8-20}$ heteroalkyl, $C_{8-20}$ alkenyl, $C_{8-20}$ alkynyl, cycloalkyl and aryl; and
(b) a population of InP light emitting quantum dots (QDs).

2. The composition of claim 1, wherein subscript p is from 70 to 80.

3. The composition of claim 1, wherein
(a) $R_2$ is $C_{8-20}$ alkyl, and
(b) subscript p is from 70 to 80.

4. The composition of claim 1, wherein $R_2$ is $C_{18}$ alkyl.

5. The composition of claim 1, having the structure:

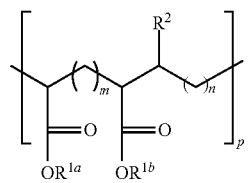

6. The composition of claim 1, wherein
(a) at least one of $R^{1a}$, $R^{1b}$ and $R^2$ is H; and
(b) at least one of $R^{1a}$, $R^{1b}$ and $R^2$ is independently selected from the group consisting of $C_{8-20}$ alkyl, $C_{8-20}$ heteroalkyl, $C_{8-20}$ alkenyl, $C_{8-20}$ alkynyl, cycloalkyl and aryl.

7. The composition of claim 1, wherein at least one of $R^{1a}$, $R^{1b}$ and $R^2$ is $C_{8-20}$ alkyl.

8. The composition of claim 1, wherein at least one of $R^{1a}$, $R^{1b}$ and $R^2$ is independently selected from the group consisting of octane, nonane, decane, undecane, dodecane, tridecane, tetradecane, pentadecane, hexadecane, heptadecane, octadecane, nonadecane, and icosane.

9. The composition of claim 1, wherein at least one of $R^{1a}$, $R^{1b}$ and $R^2$ is independently selected from the group consisting of tetradecane, hexadecane, octadecane, and icosane.

10. The composition of claim 1, wherein subscript p is from 10 to 100.

11. The composition of claim 1, wherein subscript m is 0 and subscript n is 1.

12. The composition of claim 11, having the structure:

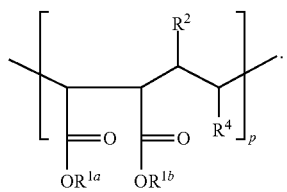

13. The composition of claim 11, wherein $R^2$ is selected from the group consisting of $C_{8-20}$ alkyl, $C_{8-20}$ heteroalkyl, $C_{8-20}$ alkenyl, $C_{8-20}$ alkynyl, and cycloalkyl.

14. The composition of claim 11, wherein $R^2$ is $C_{8-20}$ alkyl.

15. The composition of claim 11, wherein subscript p is from 25 to 100.

16. The composition of claim 1, wherein subscript m is 1 and subscript n is 0.

17. The composition of claim 16, having the structure:

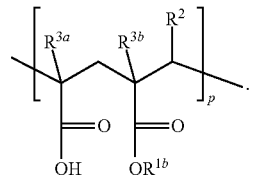

18. The composition of claim 16, having the structure:

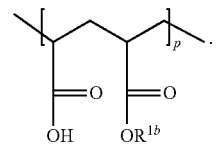

19. The composition of claim 16, wherein $R^{1b}$ is selected from the group consisting of $C_{8-20}$ alkyl, $C_{8-20}$ heteroalkyl, $C_{8-20}$ alkenyl, $C_{8-20}$ alkynyl, cycloalkyl and aryl.

20. The composition of claim 16, wherein $R^{1b}$ is $C_{8-20}$ alkyl.

21. The composition of claim 16, wherein subscript p is from 10 to 50.

22. The composition of claim 1, wherein said InP quantum dot is a core-shell quantum dot.

23. The composition of claim 22, wherein said core-shell quantum dot is InP/ZnS.

24. The composition of claim 1, wherein the quantum dot binding-ligand is bound to the InP quantum dot.

* * * * *